United States Patent
Kong (10) Patent No.: US 9,660,245 B2
(45) Date of Patent: May 23, 2017

(54) BATTERY CELL (71) Applicant: SK INNOVATION CO.,LTD., Seoul (KR)

(72) Inventor: Ming Zhe Kong, Daejeon (KR)

(73) Assignee: SK INNOVATION CO., LTD., Seoul (KR)

(*) Notice: Subject to any disclaimer, the term of this patent is extended or adjusted under 35 U.S.C. 154(b) by 151 days.

(21) Appl. No.: 14/383,273

(22) PCT Filed: Feb. 15, 2013

(86) PCT No.: PCT/KR2013/001188
§ 371 (c)(1),
(2) Date: Sep. 5, 2014

(87) PCT Pub. No.: WO2013/133540
PCT Pub. Date: Sep. 12, 2013

(65) Prior Publication Data
US 2015/0079462 A1 Mar. 19, 2015

(30) Foreign Application Priority Data
Mar. 7, 2012 (KR) .................. 10-2012-0023511

(51) Int. Cl.
H01M 2/26 (2006.01)
H01M 2/08 (2006.01)
H01M 2/30 (2006.01)

(52) U.S. Cl.
CPC ............. *H01M 2/26* (2013.01); *H01M 2/08* (2013.01); *H01M 2/30* (2013.01)

(58) Field of Classification Search
None
See application file for complete search history.

(56) References Cited

U.S. PATENT DOCUMENTS 7,504,179 B2 3/2009 Tanjou et al.
2003/0215702 A1 11/2003 Tanjou et al.
(Continued)

FOREIGN PATENT DOCUMENTS

JP 2001-126701 5/2001
JP 2004-178860 6/2004
(Continued)

OTHER PUBLICATIONS

International Search Report for corresponding International Application No. PCT/KR2013/001188.

Primary Examiner — Patrick Ryan
Assistant Examiner — Haixia Zhang
(74) Attorney, Agent, or Firm — Hauptman Ham, LLP (57) ABSTRACT Provided is a battery cell including: an electrode assembly including a first electrode part, a second electrode part, and a separation membrane; a first terminal and a second terminal extending in a first direction or a fourth direction which is an opposite direction to the first direction from the first electrode part and the second electrode part, respectively; a first lead tap and a second lead tap connected to the first terminal and the second terminal, respectively; and a case in which the electrode assembly, the first terminal, and the second terminal are accommodated, which is sealed to expose the first lead tap and the second lead tap to the outside, and in which a sealing part sealed by coating a sealing member on circumferential sides joined with each other is formed.

5 Claims, 10 Drawing Sheets (56) References Cited

U.S. PATENT DOCUMENTS

2006/0269831 A1* 11/2006 Kim .................. H01M 2/021
                                                  429/62
2010/0015511 A1   1/2010  Yoo et al.
2011/0129711 A1   6/2011  Ahn et al.

FOREIGN PATENT DOCUMENTS

| JP | 2009-266737 | 11/2009 |
| KR | 10-0873308 | 12/2008 |
| KR | 10-2010-0135382 | 12/2010 |
| KR | 10-1106428 | 1/2012 |

* cited by examiner

BATTERY CELL

TECHNICAL FIELD

The present invention relates to a battery cell, and more particularly, to a battery cell with the improved connection structure of components.

BACKGROUND ART

Generally, a secondary battery may be rechargeable and have increased capacity. A representative example of the secondary battery includes a nickel cadmium battery, a nickel hydrogen battery, a lithium ion battery, and the like. Among them, the lithium ion battery has been spotlighted as the next generation power source due to excellent characteristics such as long lifespan, high capacity, and the like. Among them, the lithium secondary battery, which has operating voltage of 3.6 V or more, is used as a power supply of a portable electronic device or several lithium secondary batteries are connected in series with each other to thereby be used for a high output hybrid vehicle. Since this lithium secondary battery has operating voltage three times higher than that of the nickel-cadmium battery or the nickel-metal hydride battery and is more excellent in view of energy density characteristics per unit weight than the nickel-cadmium battery or the nickel-metal hydride battery, the use of the lithium secondary battery has been rapidly increased.

The lithium secondary battery may be manufactured in various types. A representative type of the lithium secondary battery may include a cylindrical type and a prismatic type that are mainly used for the lithium ion battery. A lithium polymer battery that has been recently spotlighted is manufactured in a pouch type having flexibility, such that it has a relatively free shape. In addition, the lithium polymer battery has excellent safety and light weight to make portable electronic devices slim and light.

The pouched type secondary battery cell as described above is configured to include an electrode assembly, a terminal connecting a power supply to the electrode assembly, and a case sealing the electrode assembly so as to expose the terminal to the outside.

The terminal is a component exposed to an outside of the case and the battery cell according to the related art has a disadvantage in that an overall length in a height direction of the case is long while the terminal is exposed to the outside of the case.

Therefore, a development of the battery cell to solve the above problem is required.

DISCLOSURE

Technical Problem

An object of the present invention is to provide a battery cell capable of reducing an unnecessary space inside a case.

Technical Solution

In one general aspect, a battery cell, includes: an electrode assembly including a first electrode part, a second electrode part, and a separation membrane; a first terminal and a second terminal extending in a first direction or a fourth direction which is an opposite to the first direction from the first electrode part and the second electrode part, respectively; a first lead tap and a second lead tap connected to the first terminal and the second terminal, respectively; and a case in which the electrode assembly, the first terminal, and the second terminal are accommodated, which is sealed to expose the first lead tap and the second lead tap to the outside, and in which a sealing part sealed by coating a sealing member on circumferential sides joined with each other is formed.

The first lead tap may be connected to the first terminal in a second direction which is a vertical direction to the first direction and the second lead tap may be connected to the second terminal in a third direction which is an opposite direction to the second direction.

In another general aspect, a battery cell, includes: an electrode assembly including a first electrode part, a second electrode part, and a separation membrane; a first terminal extending in a first direction from the first electrode part; a second terminal extending in a fourth direction which is an opposite direction to the first direction from the second electrode part; a first lead tap and a second lead tap connected to the first terminal and the second terminal, respectively; and a case in which the electrode assembly, the first terminal, and the second terminal are accommodated, which is sealed to expose the first lead tap and the second lead tap to the outside, and in which a sealing part sealed by coating a sealing member on circumferential sides joined with each other is formed.

The first lead tap and the second lead tap may each be connected to the first terminal and the second terminal in a second direction which is a vertical direction to the first direction or a third direction which is an opposite direction to the second direction.

The first lead tap may be connected to the first terminal in a second direction which is a vertical direction to the first direction and the second lead tap may be connected to the second terminal in a third direction which is an opposite direction to the second direction.

Advantageous Effects

As described above, according to the exemplary embodiments of the present invention, when the first direction and the fourth direction illustrated in the drawings are collectively referred to as the height direction, the battery cell may reduce the overall length in the height direction.

BEST MODE

Hereinafter, a technical spirit of the present invention will be described in more detail with reference to the accompanying drawings.

However, the accompanying drawings are only examples shown in order to describe the technical spirit of the present invention in more detail. Therefore, the technical spirit of the present invention is not limited to shapes of the accompanying drawings.

Figure 1:
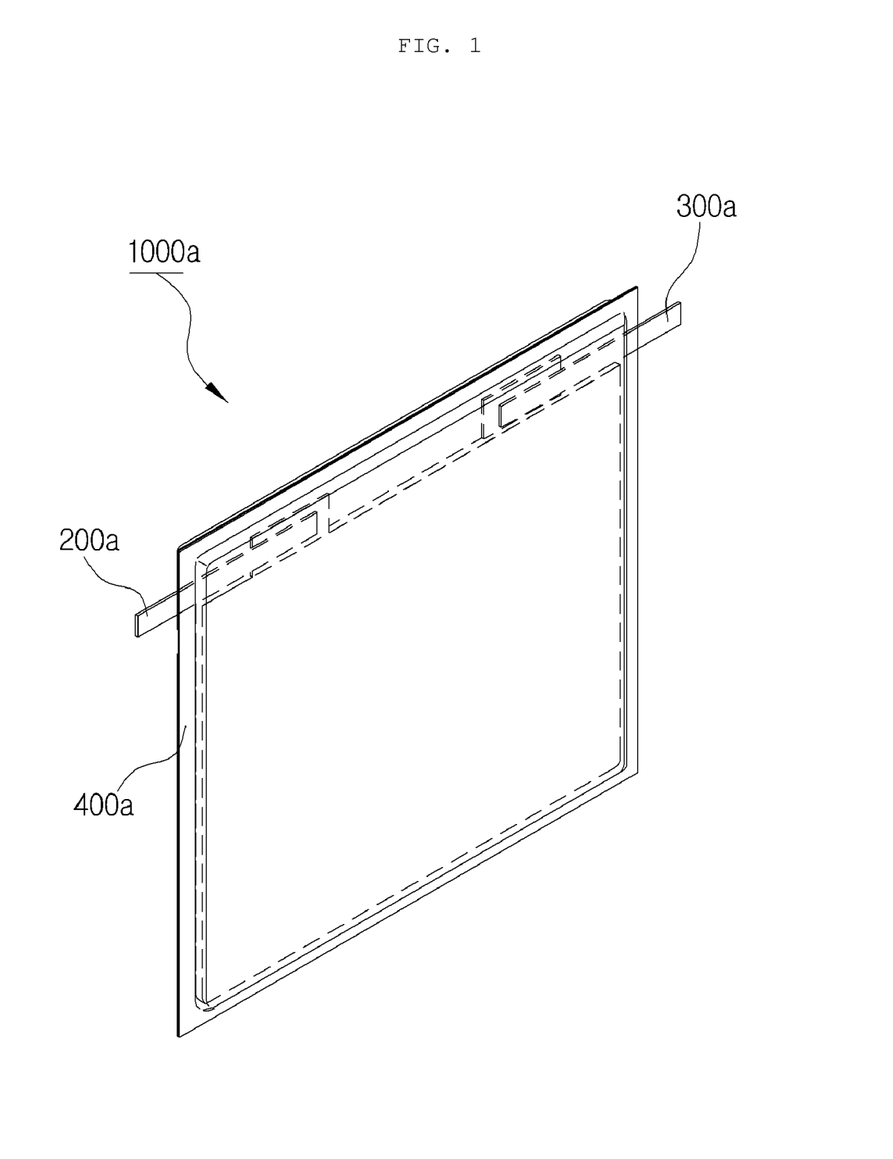
FIG. 1 is a perspective view of a battery cell according to a first exemplary embodiment of the present invention.
Figure 2:
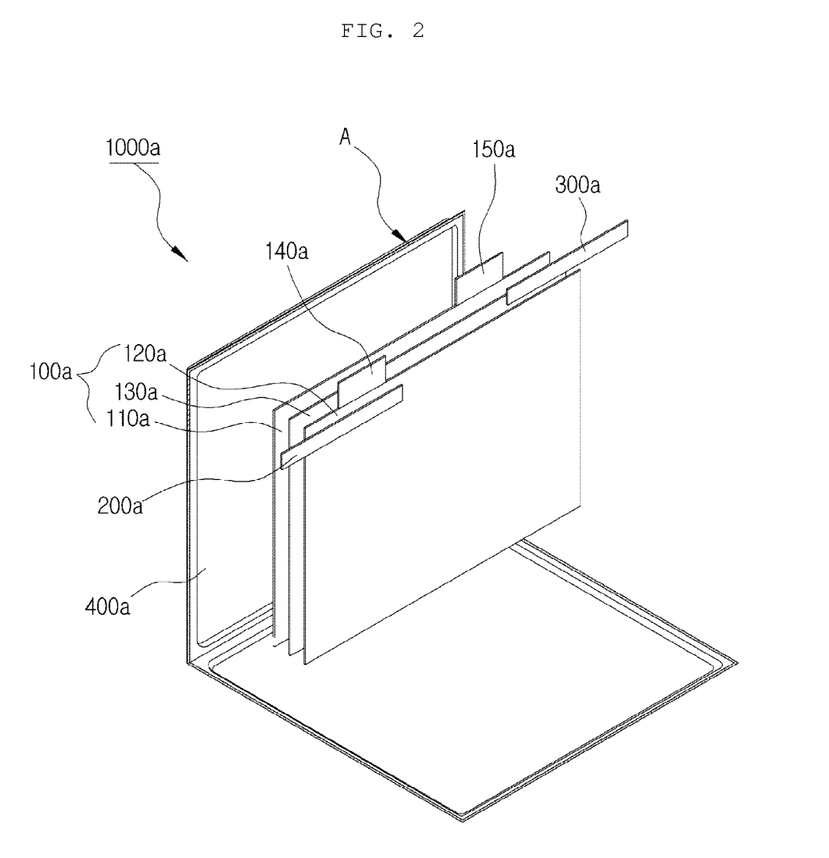
FIG. 2 is an exploded perspective view of the battery cell according to the first exemplary embodiment of the present invention.
Figure 3:
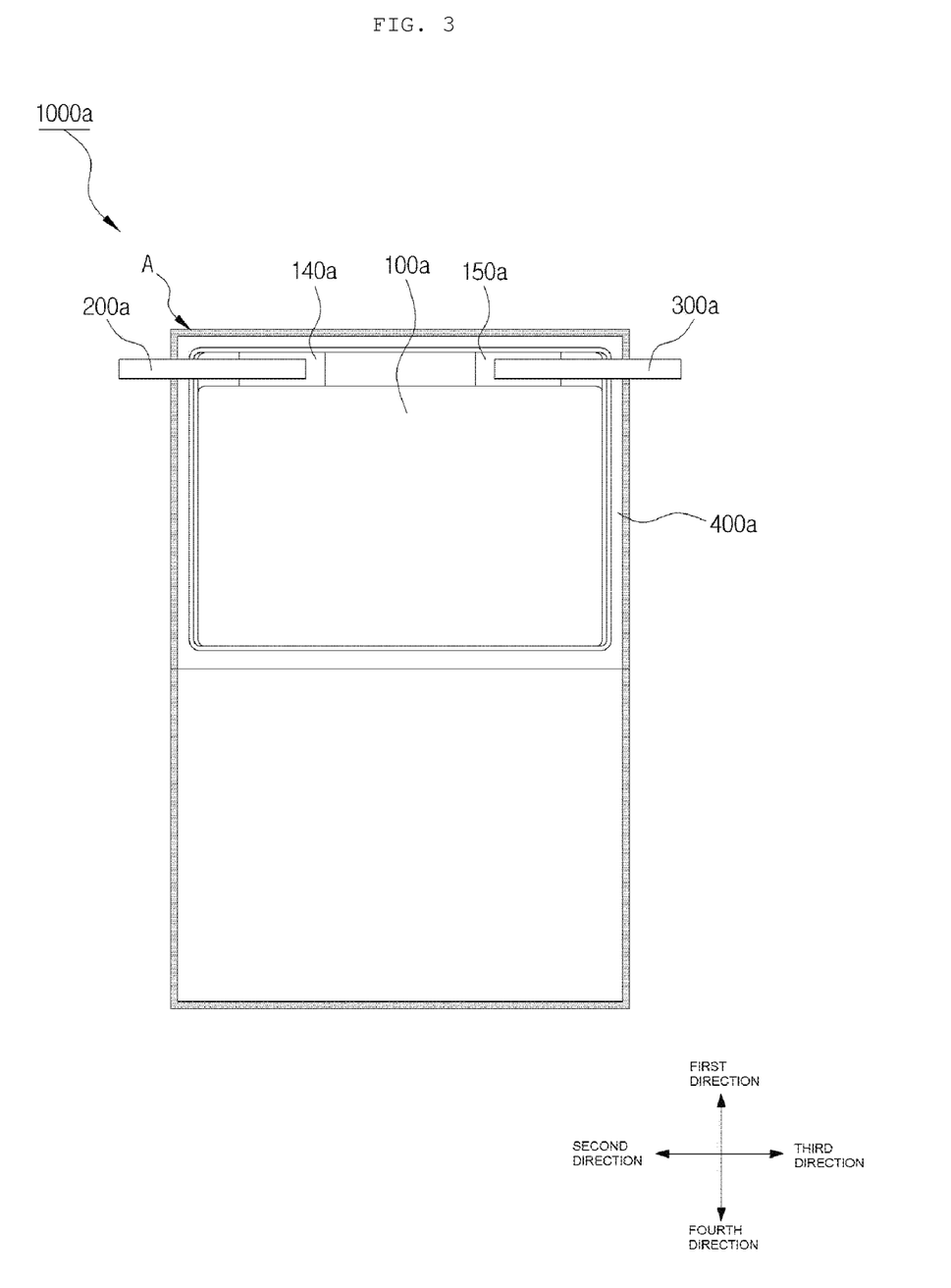
FIG. 3 is an exploded front view of the battery cell according to the first exemplary embodiment of the present invention.

FIG. 1 is a perspective view of a battery cell according to a first exemplary embodiment of the present invention, FIG. 2 is an exploded perspective view of the battery cell according to the first exemplary embodiment of the present invention, and FIG. 3 is an exploded front view of the battery cell according to the first exemplary embodiment of the present invention.

As illustrated in FIGS. 1 to 3, a battery cell 1000a according to the first exemplary embodiment of the present invention is configured to include an electrode assembly 100a, a first terminal 140a, a second terminal 150a, a first lead tap 200a, a second lead tap 300a, and a case 400a.

The electrode assembly 100a which is a component accommodated inside the case 400a is configured to include a first electrode part 110a, a second electrode part 120a, and a separation membrane 130a.

The separation membrane 130a is disposed between the first electrode part 110a and the second electrode part 120a and the first electrode part 110a, the separation membrane 130a, and the second electrode part 120a are disposed inside the case 400a, along with an electrolyte solution.

The first electrode part 110a is a cathode plate and includes cathode active material layers which are coated on both surfaces of a cathode current collector configured of a metal thin plate having excellent conductivity and an aluminum (Al) foil. As the active material, a chalcogenide compound is used. As the example, composite metal oxides such as $LiCoO_2$, $LiMn_2O_4$, $LiNiO_2$, $LiNi_{1-x}Co_xO_2$ (0<x<1), and $LiMnO_2$ have been used, but the exemplary embodiment of the present invention is not limited thereto.

The second electrode part 120a is an anode plate and includes anode active material layers which are coated on both surfaces of an anode current collector configured of a conductive metal thin plate and for example, a copper (Cu) or nickel (Ni) foil. As the anode active material, a carbon (C) based material, Si, Sn, tin oxide, composite tin alloys, transition metal oxide, lithium metal nitride, lithium metal oxide, and the like are used, but the exemplary embodiment of the present invention is not limited thereto.

The separation membrane 130a is a component to separate the first electrode part 110a from the second electrode part 120a and is made of any one selected from a group consisting of polyethylene, polypropylene, and a co-polymer of polyethylene and polypropylene, but the exemplary embodiment of the present invention is not limited thereto.

The first terminal 140a and the second terminal 150a each extend in a first direction from the first electrode part 110a and the second electrode part 120a, like a direction indication illustrated in FIG. 3.

FIG. 3 illustrates that the first terminal 140a and the second terminal 150a each extend in the first direction, but the first terminal 140a and the second terminal 150a may extend in a fourth direction.

Further, the first terminal 140a and the second terminal 150a are welded to the first electrode part 110a and the second electrode part 120a, respectively.

The first lead tap 200a and the second lead tap 300a are components for a power supply connection and the first lead tap 200a is connected to the first terminal 140a in the second direction which is a vertical direction to the first direction like the direction indication illustrated in FIG. 3 and the second lead tap 300a is connected to the second terminal 150a in the third direction which is an opposite direction to the second direction like the direction indication illustrated in FIG. 3.

The case 400a which is a basic body forming the battery cell 1000a has the electrode assembly 100a, the first terminal 140a, and the second terminal 150b accommodated therein, is sealed to expose the first lead tap 200a and the second lead tap 300b to the outside, and are provided with a sealing part A sealed by coating a sealing member on circumferential the case sides joined with each other.

Further, the case 400a is made of a conductive metal material such as aluminum, aluminum alloys, or nickel coated steel.

In this case, the sealing part A keeps a sealed state so that the first lead tap 200a and the second lead tap 300a protrude to the outside of the case 400a and the electrode assembly 100a, the first terminal 140a, and the second terminal 150a do not contact the outside.

Meanwhile, the first lead tap 200a and the second lead tap 300a each have a structure so as not to be exposed in the first direction and the fourth direction from the case 400a and the first lead tap 200a may be connected to the first terminal 140a while forming a predetermined angle to the second direction or the third direction and the second lead tap 300a may be connected to the second terminal 150a while forming a predetermined angle to the second direction or the third direction.

Figure 4:
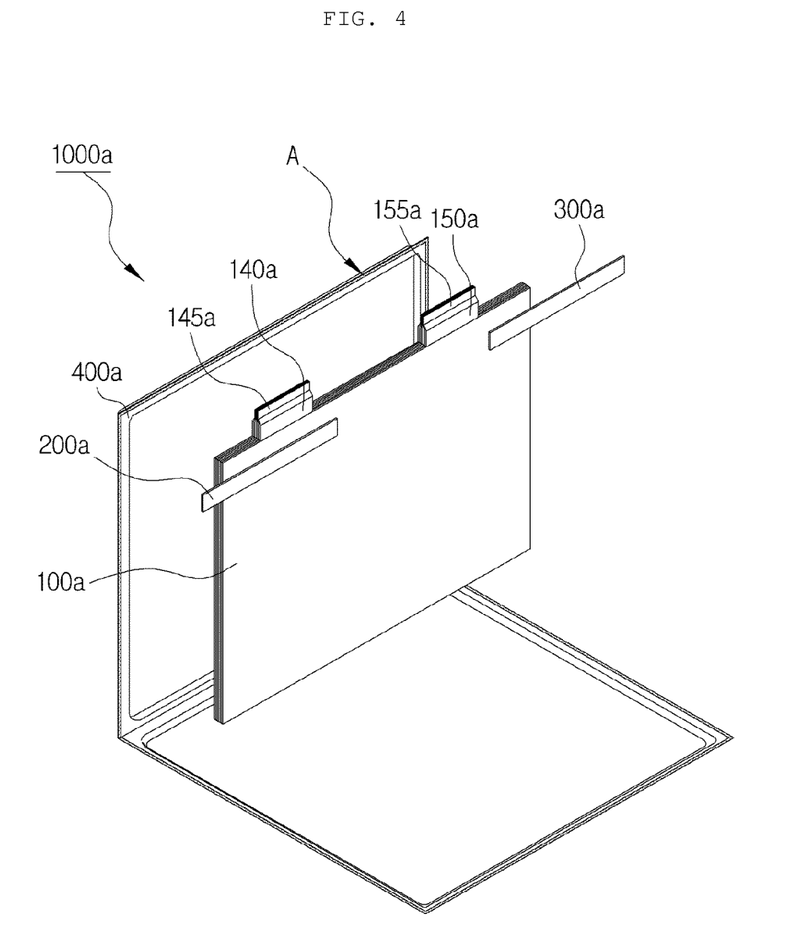
FIG. 4 is a view illustrating another example of the battery cell according to the first exemplary embodiment of the present invention.

FIG. 4 is a view illustrating another example of the battery cell according to the first exemplary embodiment of the present invention.

As illustrated in FIG. 4, the electrode assembly 100a of the battery cell according to the first exemplary embodiment of the present invention is formed by stacking the separation membrane between the first electrode part and the second electrode part and may be a stacking type electrode assembly 100a including a first terminal collection part 145a in which the first terminals 140a are collected and a second terminal collection part 155b in which the second terminals 150b are collected but is not limited to a specific form.

Figure 5:
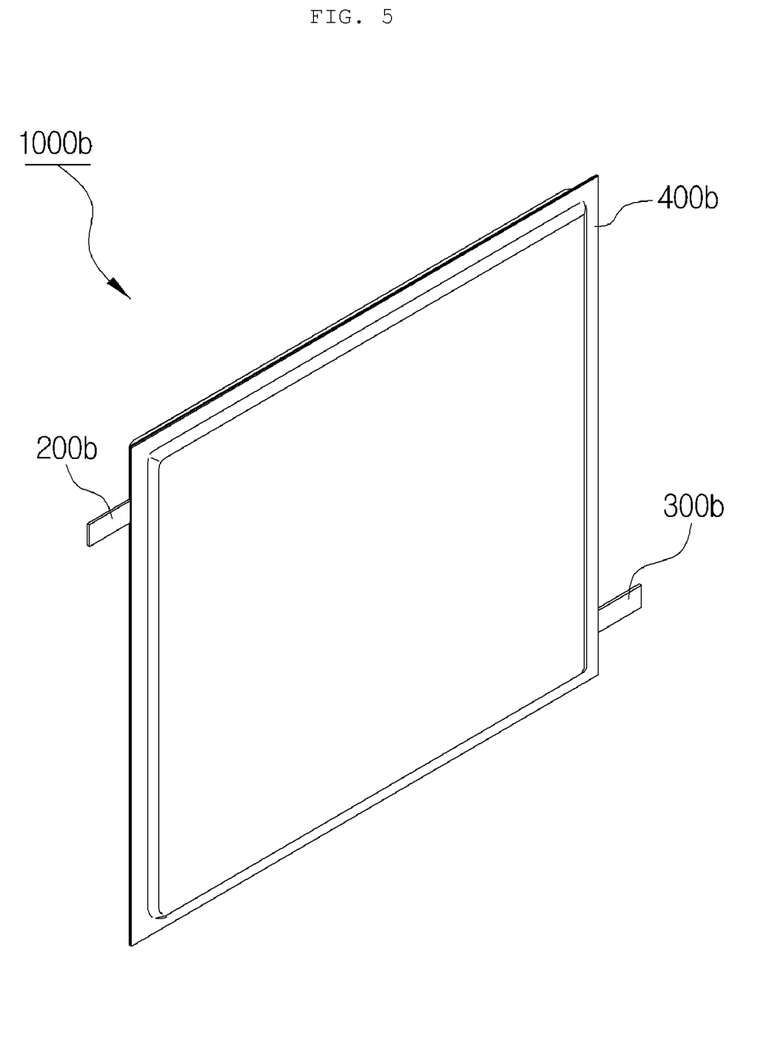
FIG. 5 is a perspective view of a battery cell according to a second exemplary embodiment of the present invention.
Figure 6:
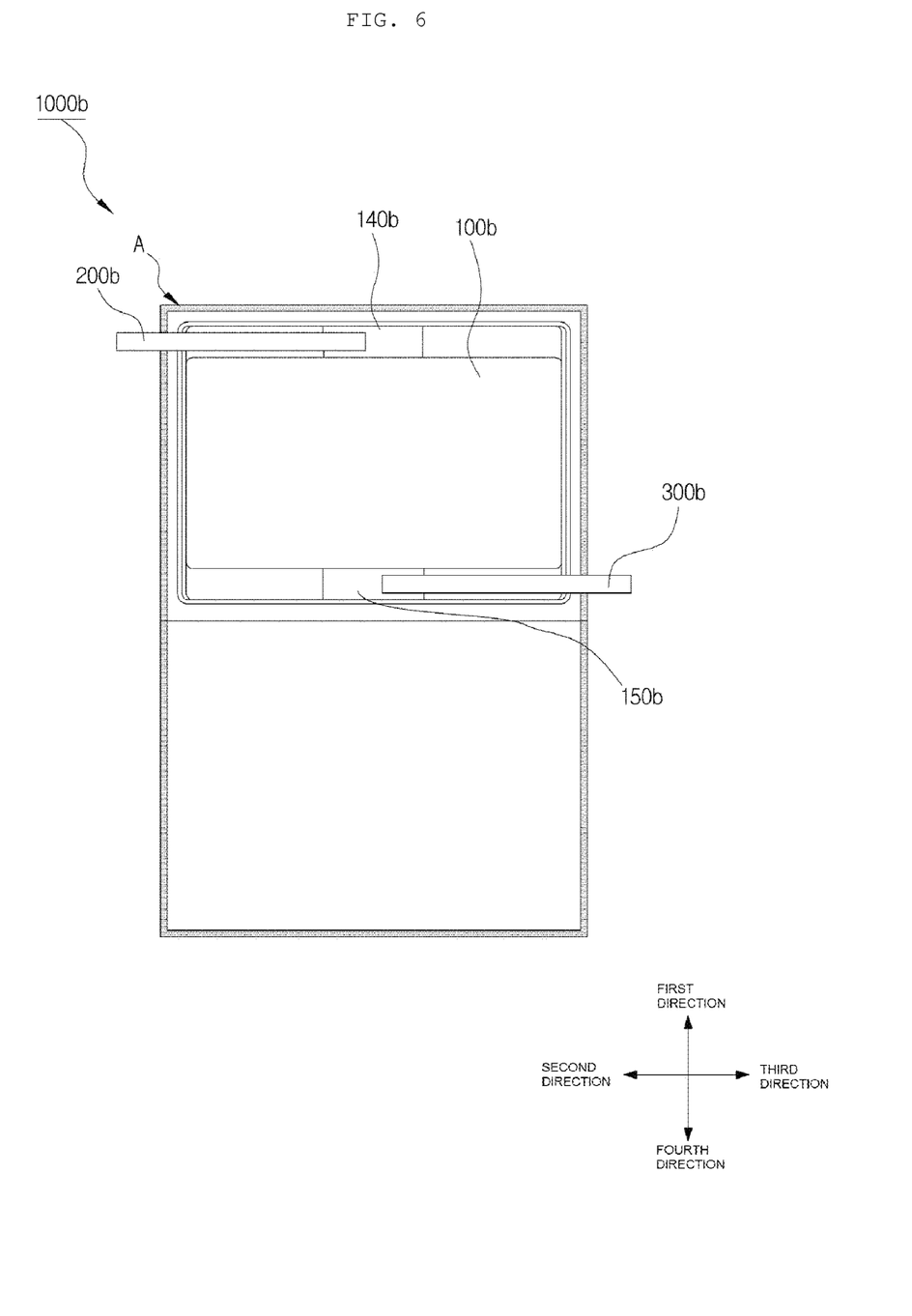
FIG. 6 is an exploded front view of the battery cell according to the second exemplary embodiment of the present invention.

FIG. 5 is a perspective view of a battery cell according to a second exemplary embodiment of the present invention and FIG. 6 is an exploded front view of the battery cell according to the second exemplary embodiment of the present invention.

As illustrated in FIGS. 5 to 6, a battery cell 1000b according to the second exemplary embodiment of the present invention is configured to include an electrode assembly 100b, a first terminal 140b, a second terminal 150b, a first lead tap 200b, a second lead tap 300b, and a case 400b.

The electrode assembly 100b is formed to be identical with the electrode assembly 100a according to the first exemplary embodiment of the present invention.

The first terminal 140b extends in a first direction from the first electrode part 110b, like the direction indication illustrated in FIG. 6.

The second terminal 150b extends in a fourth direction which is an opposite direction to the first direction from the second electrode part 120b, like the direction indication illustrated in FIG. 6.

Further, the first terminal 140b and the second terminal 150b are welded to the first electrode part 110b and the second electrode part 120b, respectively.

The first lead tap 200b and the second lead tap 300b are components for a power supply connection and the first lead tap 200b is connected to the first terminal 140b in a second direction which is a vertical direction to the first direction like a direction indication illustrated in FIG. 6 and the second lead tap 300b is connected to the second terminal 150b in a third direction which is an opposite direction to the second direction like the direction indication illustrated in FIG. 6.

The case 400b is sealed in a pouched type and is sealed by coating a sealing member on circumferential sides boned to each other.

Further, the case 400b may be not only joined by coating the sealing member, but also keep the sealed state by making the coated area of the sealing member be joined by heat fusion.

In this case, the sealing part keeps a sealed state so that the first lead tap 200b and the second lead tap 300b protrude to an outside of the case 400b and the electrode assembly 100b, the first terminal 140b, and the second terminal 150b do not contact the outside.

Meanwhile, the first lead tap 200b and the second lead tap 300b each have a structure not to be exposed in the first direction and the fourth direction from the case 400b and the first lead tap 200b may be connected to the first terminal 140a while forming a predetermined angle to the second direction or the third direction and the second lead tap 300b may be connected to the second terminal 150b while forming a predetermined angle to the second direction or the third direction.

Figure 7:
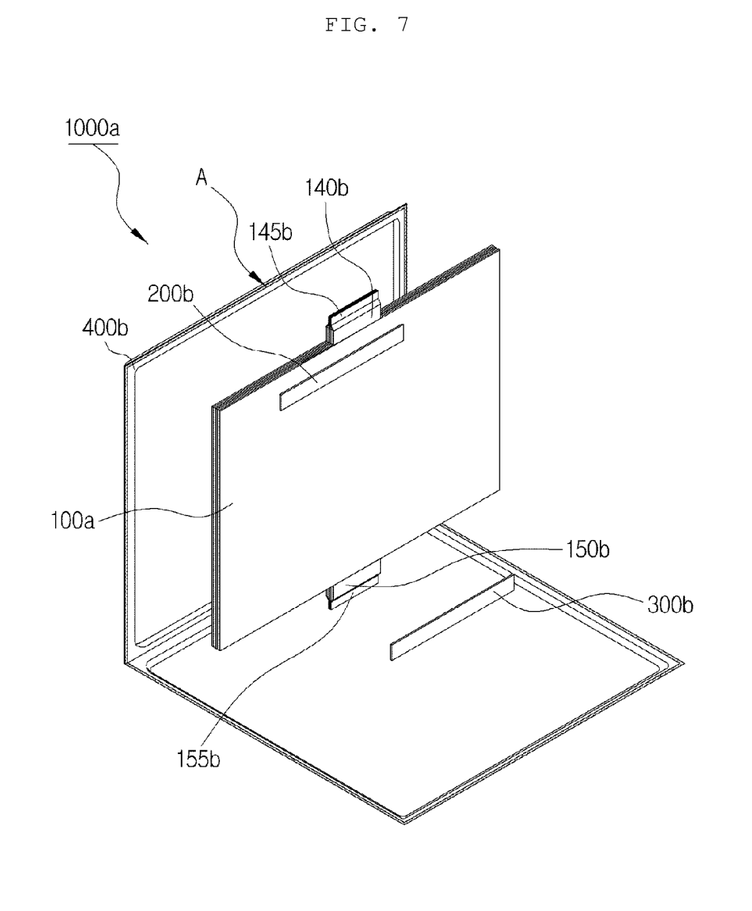
FIG. 7 is a view illustrating another example of the battery cell according to the second exemplary embodiment of the present invention.

FIG. 7 is a view illustrating another example of the battery cell according to the second exemplary embodiment of the present invention.

As illustrated in FIG. 7, the electrode assembly 100b of the battery cell according to the second exemplary embodiment of the present invention is formed by stacking the separation membrane between the first electrode part and the second electrode part and may be a stacking type electrode assembly 100b including a first terminal collection part 145b in which the first terminals 140b are collected and a second terminal collection part 155b in which the second terminals 150b are collected but is not limited to a specific form.

Figure 8:
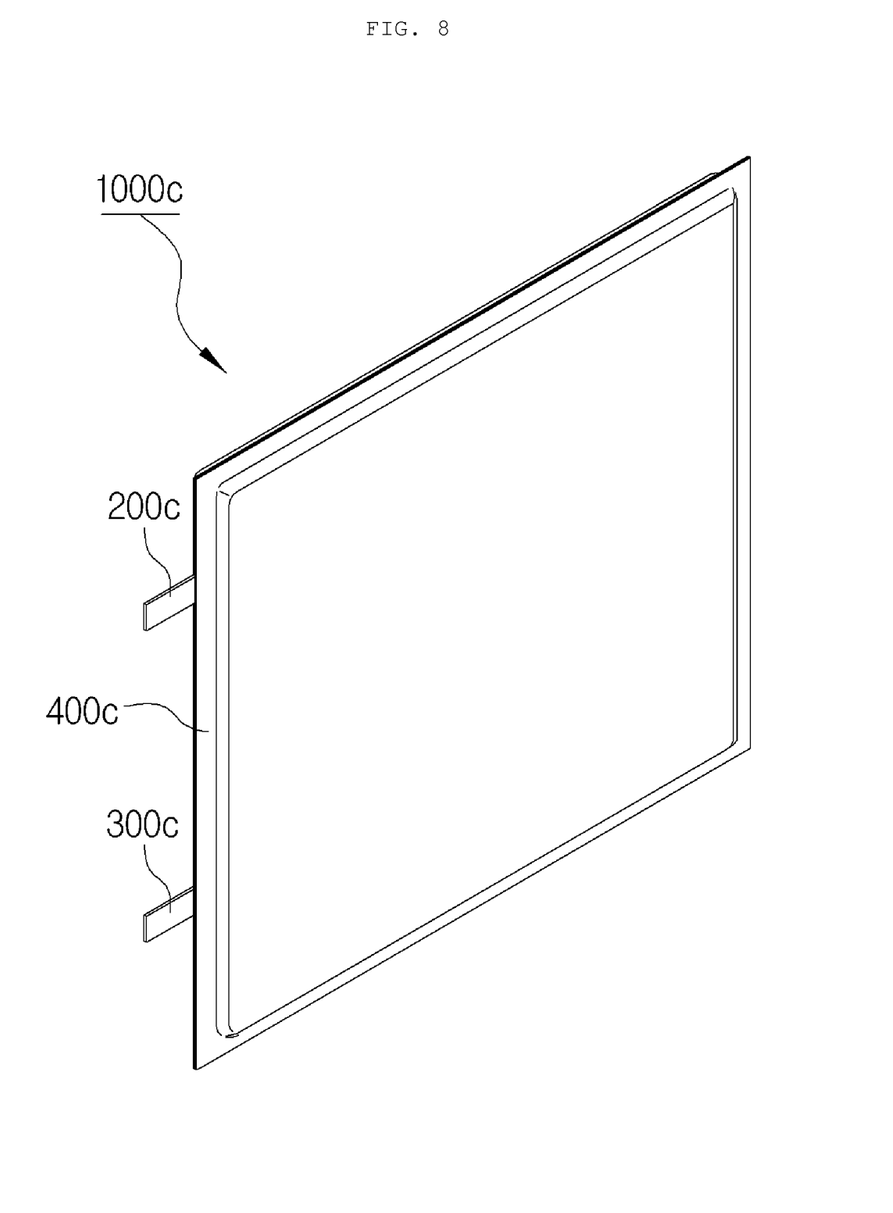
FIG. 8 is a perspective view of a battery cell according to a third exemplary embodiment of the present invention.
Figure 9:
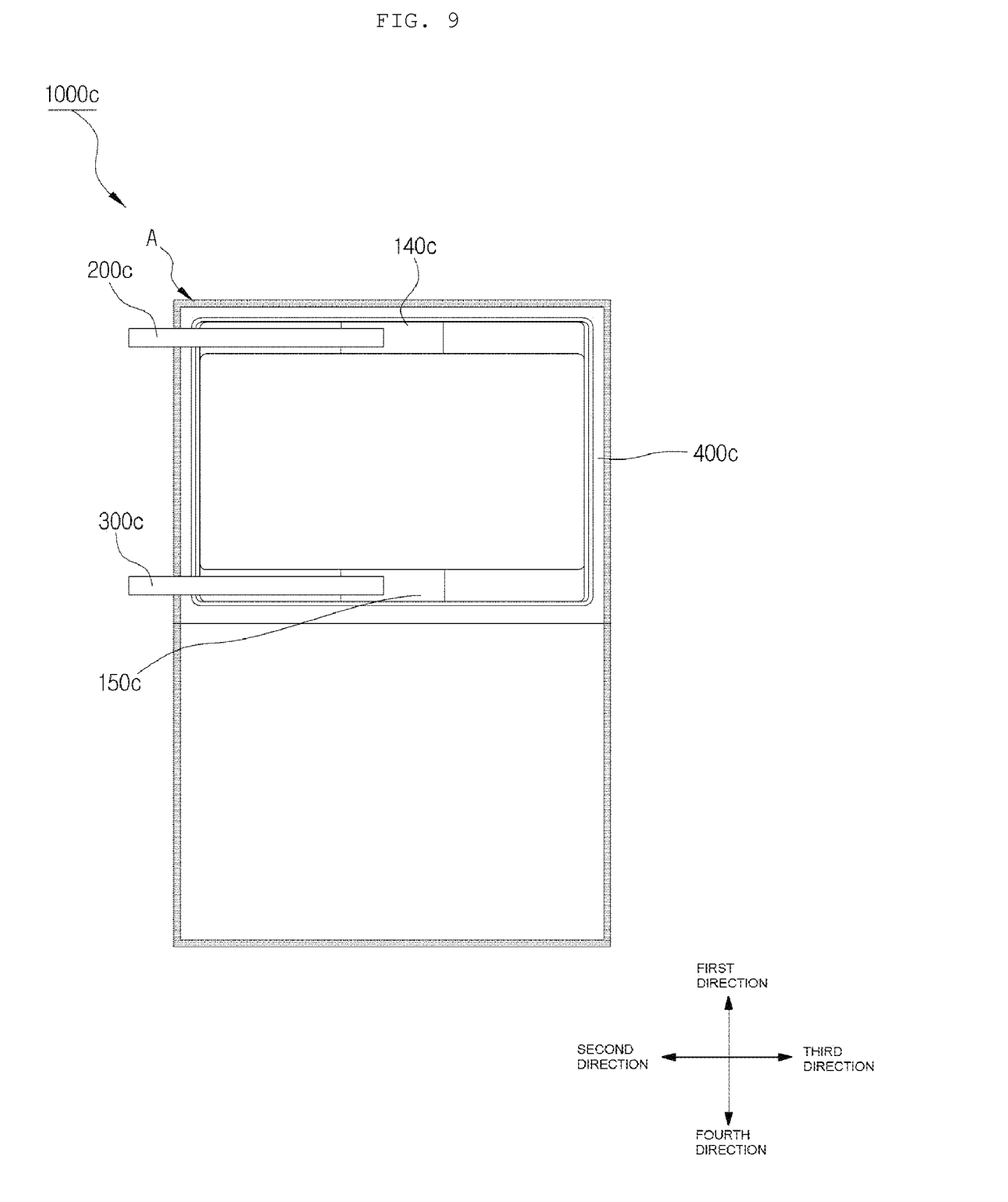
FIG. 9 is an exploded front view of the battery cell according to the third exemplary embodiment of the present invention.

FIG. 8 is a perspective view of a battery cell according to a third exemplary embodiment of the present invention and FIG. 9 is an exploded front view of the battery cell according to the third exemplary embodiment of the present invention.

As illustrated in FIGS. 8 to 9, a battery cell 1000c according to the third exemplary embodiment of the present invention is configured to include an electrode assembly 100c, a first terminal 140c, a second terminal 150c, a first lead tap 200c, a second lead tap 300c, and a case 400c.

The electrode assembly 100c is formed to be identical with the electrode assemblies 1000a and 1000b according to Embodiments 1 and 2 of the present invention.

The first terminal 140c extends in a first direction from the first electrode part 110c, like a direction indication illustrated in FIG. 8.

The second terminal 150c extends in a fourth direction which is an opposite direction to the first direction from the second electrode part 120c, like a direction indication illustrated in FIG. 9.

Further, the first terminal 140c and the second terminal 150c are welded to the first electrode part 110c and the second electrode part 120c, respectively.

The first lead tap 200c and the second lead tap 300c are each connected to the first terminal 140c and the second terminal 150c in a second direction which is a vertical direction to the first direction like the direction indication illustrated in FIG. 9.

FIG. 9 illustrates that the first lead tap 200c and the second lead tap 300c may be connected to the first terminal 140c and the second terminal 150c in the second direction which is a vertical direction to the first direction but the first lead tap 200c and the second lead tap 300c may also be connected to the first terminal 140c and the second terminal 150c even in a third direction opposite to the second direction which is a vertical direction to the first direction.

The case 400c is sealed in a pouched type and is sealed by coating a sealing member on circumferential sides boned to each other.

Further, the case 400c may be not only joined by coating the sealing member, but also keep the sealed state by making the coated area of the sealing member be joined by heat fusion.

In this case, the sealing part keeps a sealed state so that the first lead tap 200c protrudes to one side of the outside of the case 400c and the second lead tap 300c protrudes to the other side of the outside of the case 400c and the electrode assembly 100, the first terminal 140c, and the second terminal 150c do not contact the outside.

Meanwhile, the first lead tap 200c and the second lead tap 300c each have a structure not to be exposed in the first direction and the fourth direction from the case 400c and may each be connected to the first terminal 140c and the second terminal 150c while forming a predetermined angle to the second direction or the third direction.

Figure 10:
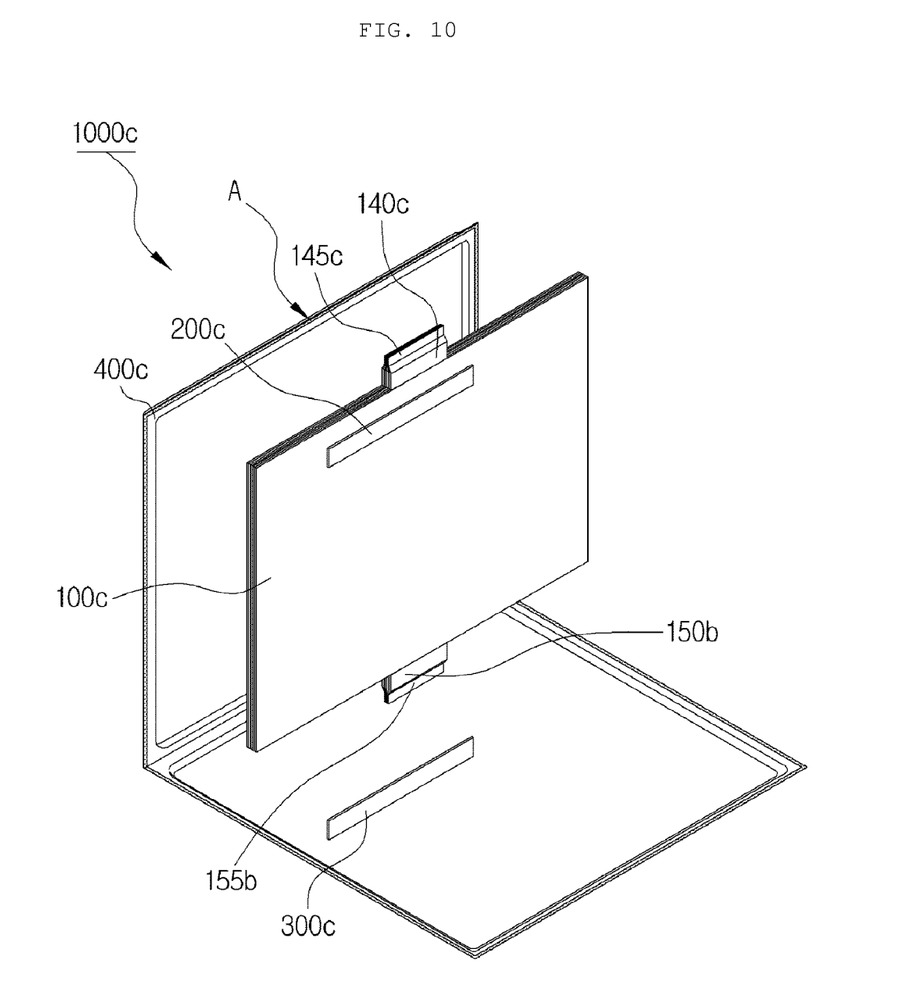
FIG. 10 is a view illustrating another example of the battery cell according to the third exemplary embodiment of the present invention.

FIG. 10 is a view illustrating another example of the battery cell according to the third exemplary embodiment of the present invention.

As illustrated in FIG. 10, the electrode assembly 100c of the battery cell according to the third exemplary embodiment of the present invention is formed by stacking the separation membrane between the first electrode part and the second electrode part and may be a stacking type electrode assembly 100c including a first terminal collection part 145c in which the first terminals 140c are collected and a second terminal collection part 155c in which the second terminals 150c are collected but is not limited to a specific form.

The battery cell according to the exemplary embodiment of the present invention is not limited to Embodiments 1, 2, and 3 and any battery cell having a pouched type in which the electrode assembly is wound inside the case may be applied.

In the battery cell configured of the first terminal and the second terminal extending in the height direction when the first direction and the fourth direction illustrated in the drawings are collectively referred to as the height direction, the first lead tap and the second lead tap connected to the first terminal and the second terminal, respectively, in the direction other than the height direction are configured and thus the first lead tap and the second lead tap are exposed in the direction other than the height direction of the case, thereby reducing the overall length of the battery cell in the height direction.

The present invention is not limited to the above-mentioned exemplary embodiments, and may be variously applied, and may be variously modified without departing from the gist of the present invention claimed in the claims.

DETAILED DESCRIPTION OF MAIN ELEMENTS

1000: Battery cell according to the present invention
100: Electrode assembly
110: First electrode part 120: Second electrode part
130: Separation membrane
140: First terminal 150: Second terminal
200: First lead tap
300: Second lead tap
400: Case
A: Sealing member

The invention claimed is:

1. A battery cell, comprising:
an electrode assembly including a first electrode part, a second electrode part, and a separation membrane;
a first terminal and a second terminal extending in a first direction or a fourth direction which is an opposite direction to the first direction from the first electrode part and the second electrode part, respectively;
a first lead tap and a second lead tap connected to the first terminal and the second terminal, respectively,
wherein the first lead tap extends in a second direction perpendicular to the first direction, and
wherein the second lead tap extends in a third direction opposite to the second direction; and
a case in which the electrode assembly, the first terminal, and the second terminal are accommodated, which is sealed to expose the first lead tap and the second lead tap to the outside, and in which a sealing part sealed by coating a sealing member on circumferential sides joined with each other is formed,
wherein the first lead tap is connected to the first terminal via a first terminal-lead tap connection, and the second lead tap is connected to the second terminal via a second terminal-lead tap connection, and
wherein the first terminal-lead tap connection and the second terminal-lead tap connection are inside the case.

2. The battery cell of claim 1, wherein the first lead tap and the second lead tap extend linearly.

3. The battery cell of claim 1,
wherein the electrode assembly includes a plurality of the first electrode parts and a plurality of the second electrode parts stacked alternatively, and a plurality of seperation members that seperate adjacent first electrode parts of the plurality of the first electrode parts and second electrode parts of the plurality of the second electrode parts,
wherein adjacent first terminals of the plurality of the first electrode parts contact with each other to form a first collection part, and
wherein adjacent second terminals of the plurality of the second electrode parts contact with each other to form a second collection part.

4. The battery cell of claim 3,
wherein a plurality of the first terminals of the plurality of the first electrode parts are bent toward a middle portion of the electrode assembly along a stacking direction to form the first collection part, and
wherein a plurality of the second terminals of the plurality of the second electrode parts are bent toward the middle portion of the electrode assembly along the stacking direction to form the second collection part,
wherein the stacking direction is a direction along which the plurality of the first electrode parts, the plurality of the second electrode parts, and the plurality of the seperation members stack.

5. The battery cell of claim 1,
wherein the first lead tap is within a boundary of the first terminal in the first direction, the third direction, and the fourth direction, and
wherein the second lead tap is within a boundary of the second terminal in the first direction, the second direction, and the fourth direction.

* * * * *